(12) United States Patent
Ulichney et al.

(10) Patent No.: US 6,278,530 B1
(45) Date of Patent: Aug. 21, 2001

(54) MULTI-DIMENSIONAL DITHERING USING ONE-DIMENSIONAL DITHER ARRAYS

(75) Inventors: Robert Alan Ulichney, Stow, MA (US); Robert Stephen McNamara, Portola Valley, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/062,227

(22) Filed: Apr. 17, 1998

(51) Int. Cl.[7] ........................ H04N 1/405
(52) U.S. Cl. .................. 358/1.9; 358/457; 358/460
(58) Field of Search ............ 358/1.9, 456, 466, 358/298, 457, 460; 382/237, 270

(56) References Cited

U.S. PATENT DOCUMENTS

| 5,333,260 | 7/1994 | Ulichney . |
| 5,333,262 | 7/1994 | Ulichney . |
| 5,495,345 | 2/1996 | Ulichney . |
| 5,508,822 | 4/1996 | Ulichney et al. . |
| 5,602,941 | 2/1997 | Charles et al. . |

OTHER PUBLICATIONS

Cheung et al.; Pending Application Serial No. 09/016,316; "Method for Low Complexity, Low Memory Inverse Dithering"; Date filed Jan. 30, 1998.

*Primary Examiner*—Scott Rogers
*Assistant Examiner*—Gholam A. Behpour
(74) *Attorney, Agent, or Firm*—Cesari & McKenna, LLP

(57) ABSTRACT

An apparatus for dithering a signal such as a pixels of an image having multiple address dimensions. A predetermined number of least significant bits of a first address of the pixel are used to index a one-dimensional dither array. Indexing the array produces a first dither value. A predetermined least number of significant bits of a second address of the pixel are combined with the first dither value to index a second one-dimensional dither array. The indexing of the second array produces a final dither value that can be used to dither the pixels.

7 Claims, 16 Drawing Sheets

FIG. 4

| | | | |
|---|---|---|---|
| (a) | g = 0/8 | 8 EQUAL CANDIDATES:<br>BINARY PATTERN: ···<br>DITHER ARRAY: | 1108 — DITHER PERIOD    CHOICE[0] = 0 |
| (b) | g = 1/8 | SINGLE CANDIDATE:<br>BINARY PATTERN: ···<br>DITHER ARRAY: | |
| (c) | g = 2/8 | 2 EQUAL CANDIDATES:<br>BINARY PATTERN: ···<br>DITHER ARRAY: | CHOICE[1] = 0 |
| (d) | g = 3/8 | SINGLE CANDIDATE:<br>BINARY PATTERN: ···<br>DITHER ARRAY: | |
| (e) | g = 4/8 | 4 EQUAL CANDIDATES:<br>BINARY PATTERN: ···<br>DITHER ARRAY: | CHOICE[2] = 2 |
| (f) | g = 5/8 | SINGLE CANDIDATE:<br>BINARY PATTERN: ···<br>DITHER ARRAY: | |
| (g) | g = 6/8 | 2 EQUAL CANDIDATES:<br>BINARY PATTERN: ···<br>DITHER ARRAY: | CHOICE[3] = 1 |
| (h) | g = 7/8 | SINGLE CANDIDATE:<br>BINARY PATTERN: ···<br>DITHER ARRAY: | |
| (i) | g = 8/8 | BINARY PATTERN: ···<br>DITHER ARRAY:<br>ADDRESS: 0 1 2 3 4 5 6 7 | |

FIG. 11

MULTI-DIMENSIONAL DITHERING USING ONE-DIMENSIONAL DITHER ARRAYS

FIELD OF THE INVENTION

This invention relates generally to dithering digital signals, and more particularly to dithering pixels having addresses in multiple dimensions.

BACKGROUND OF THE INVENTION

When rendering an image, dithering is used to produce an illusion of continuous image intensity even though the picture elements (pixels) may have a limited granularity in amplitude. For example, a grey-scale image typically requires about eight bits per pixel to give a reasonable gradient in image intensity, e.i., 256 grey-scale levels. Dithering is a process that will produce a perceptually similar image when fewer bits are used per pixel. Indeed, dithering works when only one bit is used per pixel in a "bi-tonal image. In other words, the one bit only indicates whether the pixel is "on" or "off," e.i., black or white.

Several methods for dithering are known in the prior art. The class of dithering which is of concern here is know as ordered dithering. Ordered dithering is a point process that uses only the current pixel of an input image to generate a corresponding pixel in an output image, no other pixels are considered. Ordered dithering can be one-dimensional, two-dimensional, and so forth. As an advantage, ordered dithering is fast and simple to implement. A key element contributing to the quality of the output image in ordered dithering is a good dither array.

One popular method that is used in two-dimensional ordered dithering is known as recursive tessellation, also known as Beyer's dither. There, a dither array is organized as a periodic and deterministic array of integers in the range 0 to $2^L-1$, where $2^L$ is the number of levels in the array. In order to ensure that the process is "mean-preserving," i.e., the average values found in the input image are maintained in the output image, the array of integers must be normalized, please see, Ulichney, "Video Rendering," *Digital Technical Journal*, Vol. 5, No. 2, pp. 9–18, 1993.

An important special case exists when the number of input and output levels of the dithering system is a power of two. In this case, the values of the dither array (0 to $2^L-1$) can be used without normalization given that the other elements in the system are properly designed. In particular, the values of the "raw" input image must first be adjusted. A simple hardware implementation for adjusting raw input image values is described in U.S. Pat. No. 5,602,941, "Input Modification System for Multilevel Dithering," issued to Ulichney et al. on Feb. 11, 1997.

There are several systems that use dither arrays to produce dithered images. For multilevel (more than two output levels) dithering, these systems include methods that use two memories, a single memory, and a bit shifter. For bi-tonal (2 output levels) dithering, a system with a comparator can be used.

One situation where dithering is used is in tandem with inverse-dithering. Inverse-dithering attempts to reconstruct the original image. One prior art inverse-dithering system uses a priori knowledge of the dither array to achieve a better reconstruction of the original image. There is a substantial implementation advantage when the inverse-dithering operates one dimensionally. That is, one-dimensional dithering only operates on a current pixel line horizontally, e.i., along the x-axis, without regard of previous or following pixel lines. For such a scheme to work best, the same dither array must be used for every image line. A one-dimensional (1-D) dither array is ideal for this application.

Other studies of 1-D dithering have focused on more complex neighborhood-operation-based schemes such as error-diffusion or model-based half-toning.

However, one-dimensional dithering has practical applications beyond image processing. In any processes where the signal is one dimensional, such as audio, and the amplitude is to be quantitized, dithering can help produce the illusion of an almost continuous output signal even though the input signal has discrete values. Therefore, it is desired to use one-dimensional dither arrays to perform multi-dimensional dithering so that memory storage can be reduced.

SUMMARY OF THE INVENTION

Provided is an apparatus for dithering a digital signal having a plurality of address dimensions. In one aspect of the invention, the digital signal is made of image pixels, and each pixel has a vertical and horizontal address dimension.

The apparatus includes component sections for each dimension. The component sections are serially connected so that the output of a previous section can be part of the input of the next section. The output of the last section includes final dither values can that be applied to the digital signal.

In one implementation for producing sequentially accessed dither values, a first counter is incremented for each sequentially accessed first address of the first dimension such as a vertical dimension. The current values of the first counter are used to index a first dither array to produce the first dither values.

A second counter is initialized to the first dither value, and incremented for each sequentially accessed second address of the second dimension such as a horizontal dimension. The current values of the second counter are used to index a second dither array to produce final dither values that can be applied to the digital signal.

BRIEF DESCRIPTION OF THE DRAWINGS

FIG. 4 is a chart of an evolving dithering pattern;

FIG. 5b is a flow graph of a preferred embodiment of the method of FIG. 5a;

FIG. 11 is a chart of a generalized evolving dithering pattern;

DETAILED DESCRIPTION OF PREFERRED EMBODIMENTS

Multi-Dimensional Dithering

Figure 1:
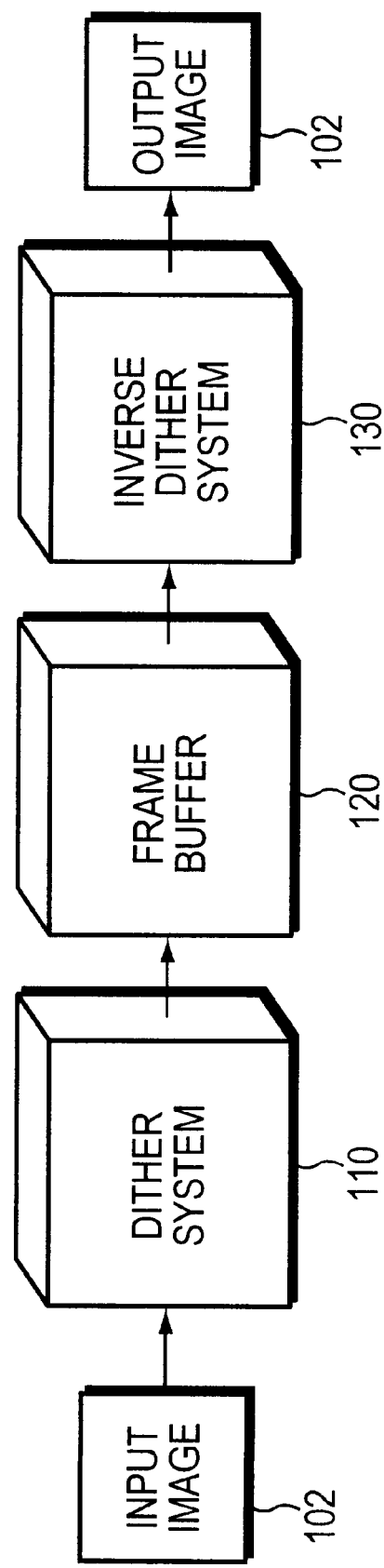
FIG. 1 is a block diagram of a dithering system using the dithering of the invention.

FIG. 1 shows a system 100 that can use dithering as described herein. As shown in FIG. 1, a digital input image 101 is presented to a dithering system 110 which produces a dithered image that can be stored in a frame-buffer 120. Subsequently, an inverse dithering system 130 can reconstruct, as close as possible to the input image 101, an output image 102. The output image 102 can be rendered on an output device such as a video monitor.

The present system uses one-dimensional dither arrays for performing the dithering. As an advantage, the total memory requirement for storing the dither arrays increases linearly with the number of dimensions for which the dithering is performed. In the prior art, an array for a two-dimensional dither array is typically K×L. Here, the size is K+L, thereby reducing storage. In addition, as will be described in further detail below, certain one-dimensional dither values can be generated in a way that permit efficient hardware and software implementations. A generalized method for generating one-dimensional dither arrays of any size is also disclosed.

Figure 2:
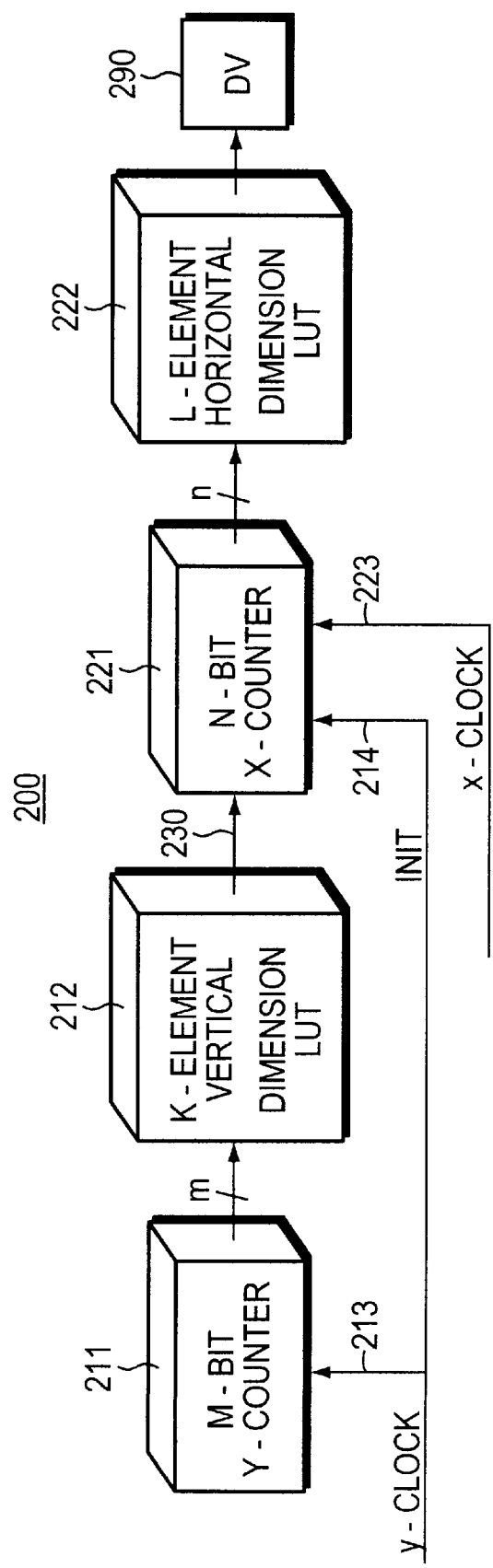
FIG. 2 is a block diagram of a sequentially accessed dithering system.
Figure 3:
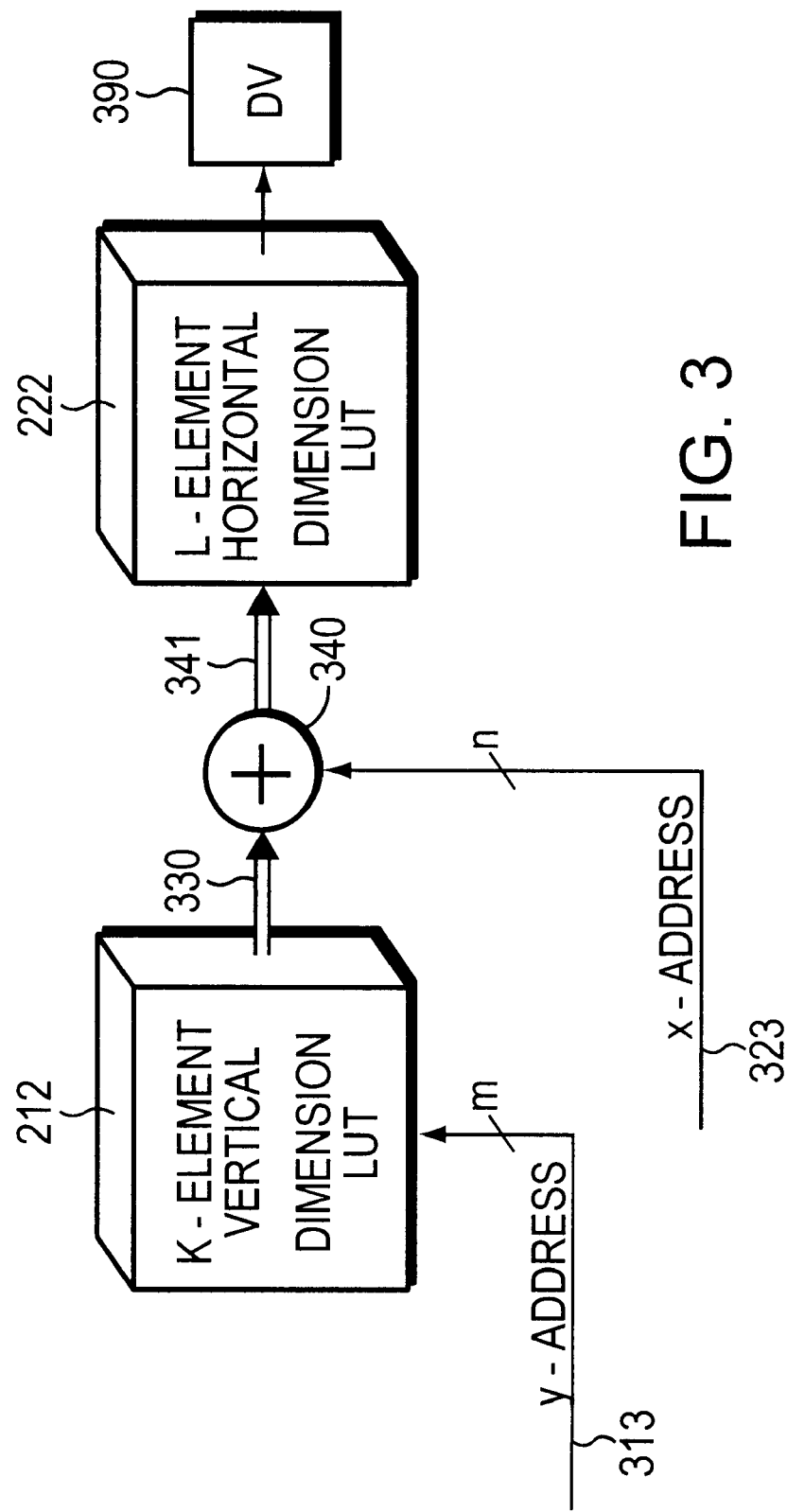
FIG. 3 is a block diagram of a randomly accessed dithering system.

FIGS. 2 and 3 show two variants of a multi-dimensional dithering system. The embodiments shown are for a two-dimensional dithering system. However, it should be apparent to one of ordinary skill in the art that the basic components described herein can be used to construct a dithering system of any number of dimensions. In general, the components of the sections which produce dither values for each dimension are connected to each other serially. That is, the output of each previous section becomes part of the input for the next section, with the output of the final section producing the final dither values.

The system 200 shown in FIG. 2 generates dither values for sequentially accessed pixel addresses, and the system 300 shown in FIG. 3 generates dither values for randomly accessed pixel addresses. The sequential system 200 is suitable for dithering all or part of an image in raster order. The random-access system 300 can be used where the dithering is performed in some other order, for example, dithering a small portion of the image out of raster order, such as a line sloping up to the left, or a circle.

In a two-dimensional dithering system (M×N), the horizontal direction along the x-axis can be raster scan lines having, for example, N pixel possible pixel positions. The vertical direction indicates the M possible raster lines that are used to form the entire image. For each possible vertical position (first address) of a raster line there are multiple possible pixel positions (second addresses) on that line.

Generating Sequentially-Accessed Dither Values

For the sequential system 200, each dithering section for each dimension can use two components, a bit-counter and a look-up table (LUT). Therefore, the two-dimensional dithering system 200 includes an M-bit y-counter 211 and a K-element vertical dimension look-up table (LUT) 212 (first section), and an N-bit x-counter 221 and an L-element horizontal look-up table (LUT) 222 (second section). The sections are serially connected to each other so that the output of the first section is part of the input of the second section. The LUTs 212 and 222 are one-dimensional dither arrays. Methods and apparatuses for generating various one-dimensional dither arrays are described in further detail below. In one efficient embodiment shown in FIG. 6, the horizontal LUT 222 is replaced by a simple wiring reversing circuit.

Typically, the number of entries in each LUT are equal to some power of two, for example, eight or thirty-two, and the vertical period, herein sometimes referred to as "phase," of dithering is equal to the horizontal period.

A y-clock signal on line 213 increments the M-bit counter 211, and a x-clock signal on line 223 increments the N-bit counter. The y-clock signal is asserted each time a new raster line is started, and the x-clock signal is asserted for each pixel position on that raster line. In other words, the clock signals effectively denote the addresses of the pixels in the image. The y-clock signal also serves as an initialization (init) signal on line 214 for the counter(s) in the following serially connected sections. In other words, the N-bit x-counter 221 is reset each time a new raster line is started. It should be understood that when there are additional dimensions the x-clock signal, as well as the y-clock signal, would initialize counters of following sections.

During operation, the least significant m bits of the current count in the m-bit counter 211 are used as an index for the one-dimensional vertical look-up table 212. The value of m is such that $2^m = K$. indexing this LUT 212 produces a first dither value on line 230. The first dither value is used as an initial count for the N-bit counter 221. Therefore, the maximum size of each of the K dither value elements in the LUT 212 should not be larger than N. The least significant n bits of the current value of the x-counter are used as an index for the horizontal LUT 222 to produce a second, and in the case of the two-dimensional system, final dither value (DV) 290. The value of n is such that $2^n = L$. The final dither values are sequential in that they generates dither values for the pixels in raster order. The final dither values 290 can be applied to the current pixels at the corresponding addresses.

Generating Randomly-Accessed Dither Values

The system 300 shown in FIG. 3 yields the same results as the system 200. In this embodiment, the clock signals and the counters are not needed. However, this system needs a y-address and an x-address of the image pixels. Here, the least significant m bits of the y-address are used to address the vertical dimension (phase) LUT. The output from the phase LUT 212 is added to the x-address to index the horizontal LUT.

Therefore, in the system 300 for generating random dither values, the least significant m bits of the y-address signal on line 313 are used as the index of the LUT 212 to produce the first dither value on line 330. The component (⊕) 340 adds the first dither value to the bits of a current x-address on line 323. The n least significant bits of the sum (mod n) on line 341 is used to index the horizontal LUT 222 to produce the final dither value 290.

The preferred techniques for generating dither values for the LUTs are described in the following sections.

Recursive Tessellation for Generating an Efficient One-Dimensional Horizontal Dither Array As was stated above, a dither array is an ordered array of integers, for example, from 0 to $(2^N-1)$, where 2 is the number of array levels. While dither arrays can be used in multi-level systems, it is easiest to design and illustrate the generation of the array for a bi-tonal system where values can only be black or white.

For a one-dimensional dither array with $2^N$ elements, consider the problem of representing $(2^N+1)$ fixed, flat, gray levels from full white (0 elements on) to full black ($2^N$ elements on), and all the integer steps in-between. The goal is to produce a dither array whose members are ordered as homogeneously as possible keeping in mind that the array is to be repeated periodically; thus the beginning of the array effectively wraps around to the end of the array.

Figure 4:
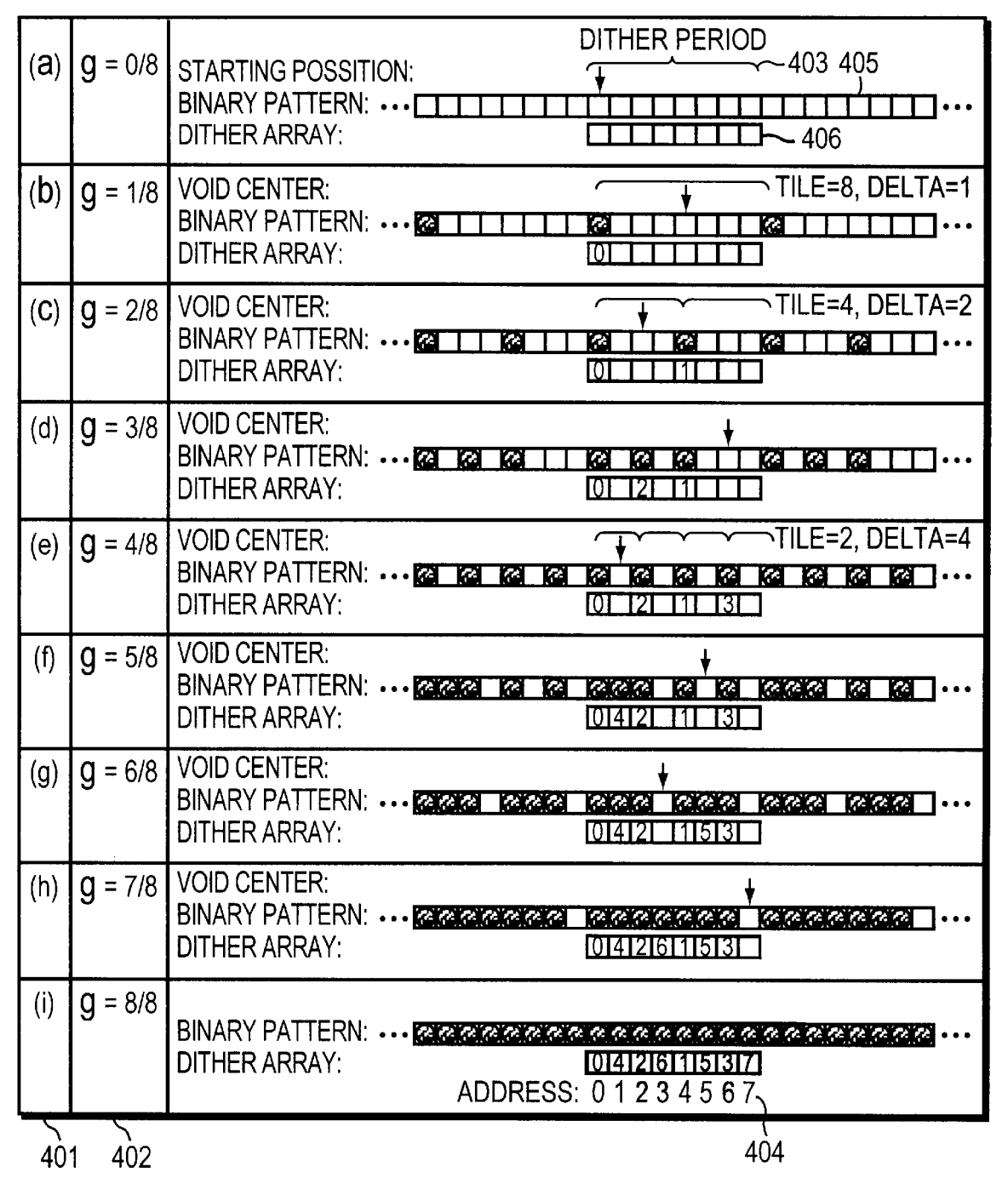

FIG. 4 shows the incremental build-up (steps a to i in column 401) of a binary pattern from zero-out-of-eight pixels on (a), to eight-out-of-eight pixels on (i), column 402. The binary pattern 405 of FIG. 4 is assumed to extend forever to the left and to the right, e.g., ( . . . ), replicating the same eight element pattern. The "cells" of the pattern would store the dithered pixel values. The fundamental "Dither Period" 403 is indicated on the top of FIG. 4.

The order (stages a to i) that pixels are turned on in the binary pattern is governed by the dither array. The state of build-up of the dither array is also shown for each stage of the build-up.

The bottom of FIG. 4 indicates the "address" 404 of the elements in the dither array. The mission is to order the eight-element array from 0 to 7 in such a way as to make the resulting binary pattern as homogeneous as possible for all gray levels.

The build-up begins in stage a with a blank binary pattern 405, and a blank dither array 406. The downward arrows in each stage a to i indicate the selection of the first location as the beginning of the stage. In FIG. 4, the selection from stage a is manifested as a black pixel in the binary pattern and value of one in the dither array. This results in one "tile" of size eight pixels as indicated, periodically replicated. To maximize homogeneity, the next pixel to turn on should be in the center of the void between two "on" pixels. The arrow in stage b selects the center of this void, and the center of the tile.

In stage c, this choice is shown as a black pixel in the selected location and a value of 1 in the corresponding location in the dither array. A new periodic (delta=2) tile of size 4 is evident. The center of the first void or tile is indicated with an arrow as the next selection.

Stage d shows this choice with a value of 2 in the dither array. Also shown in stage d is the center of the remaining void as the next selection.

In stage e, there is a new tile size of 2 pixels in force. Four tiles of size two are shown, with an arrow in the center of the first one indicating the next selection.

In stages b, c, and e, a value of "delta" is shown. In each case the value of the dither array entry that corresponds to the center of a particular tile happens to be the value of the already-assigned dither array element at the right edge of that tile added to the value of delta. This is true for the remaining selections in stages f through i. The finished dither array for this 8-element case is shown in stage i for $8=2^N$, where N=3. The elements of the array are: [0 4 2 6 1 5 3 7]

The number of one-dimensional tiles sizes that are recursively tessellated in this case is three. In the general case of dither periods of size $2^N$, there are N tiles of size $2^N$, $2^{N-1}$, . . . , and $2^1$.

Figure 5A:
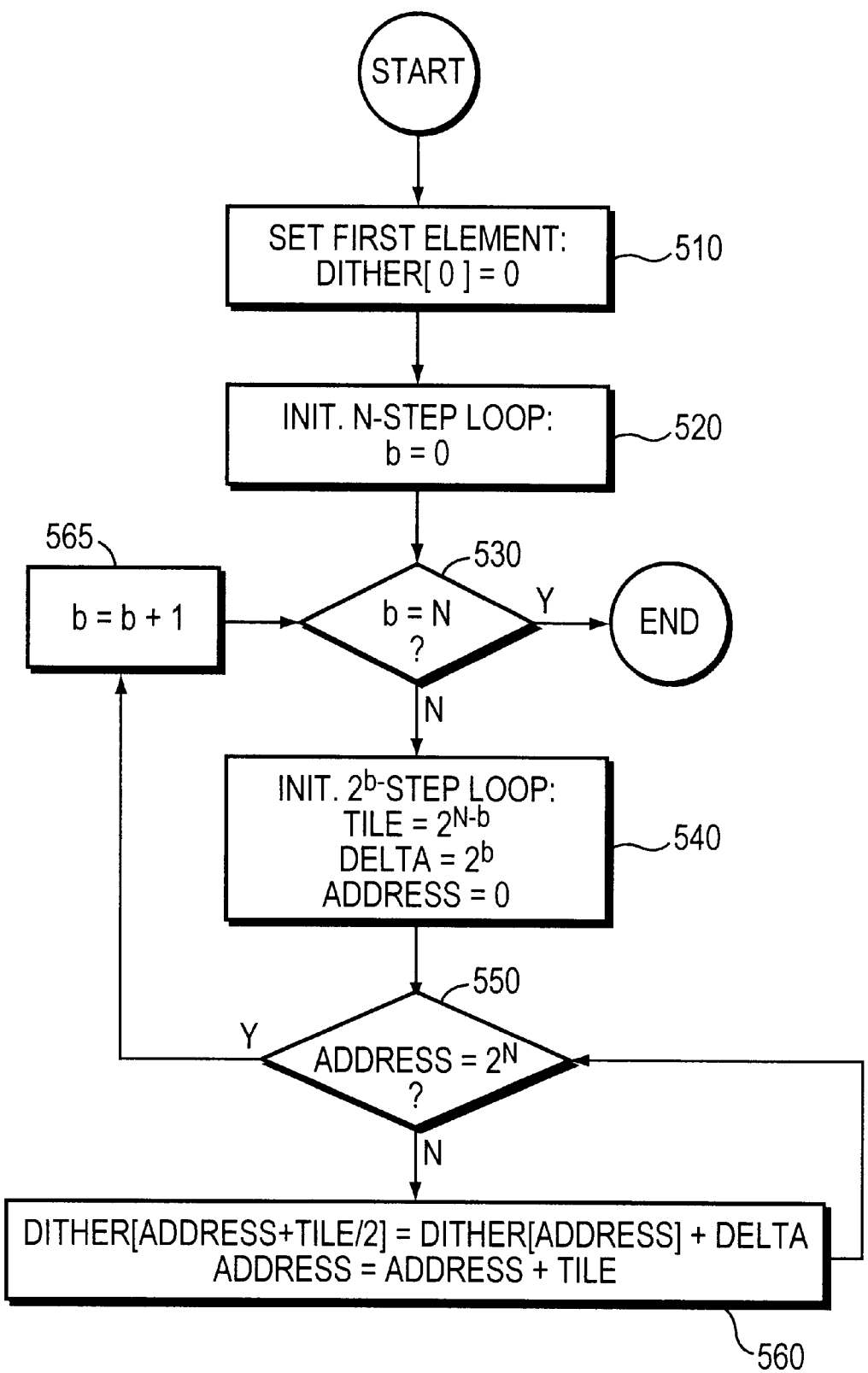
FIG. 5a is a flow graph of a method for determining a bit-reversed dither array.

A first method for generating a 1-D dither array given a power of $2^N$ is shown in FIG. 5a. This method builds an array "Dither[]" of size $2^N$. The method begins in step 510 by setting the first dither array element, Dither[0]=0, and initializing a counter b=0 in step 520.

As determined in step 530, the top-level loop has N iterations. There is one iteration for each tile size. In each iteration of the top-level loop, the size of the tile is set to $(2^{N-b})$, and delta is set to $2^b$, step 540. The actual assignment of dither array values occurs in a nested loop beginning with step 550 that has $2^b$ iterations, one iteration for each of the tiles in the dither period where the address at the center of each tile is assigned a value in step 560. That value is equal to the already-assigned dither array value at the beginning of the tile plus the value of delta. The counter b is incremented in step 565 for each iteration until the end.

Evaluation of the method shown in FIG. 5a reveals that the values of the resulting dither array will always be the bit reverse of the address of those values. In the top-level N-step loop, the counter b represents the bit that is being assigned in the bit-reversed value. The adding of the value delta in the step 560 has the effect of setting the $b^{th}$ bit.

Therefore, the key observation is that the values of a homogeneous one-dimensional dither array are always available as the bit reverse of the pixel address. Indeed, this is true for the eight-element case illustrated in FIG. 4, and as shown in Table A.

TABLE A

| Address | | Dither Value | |
|---|---|---|---|
| Decimal | binary | binary | decimal |
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

Figure 5B:
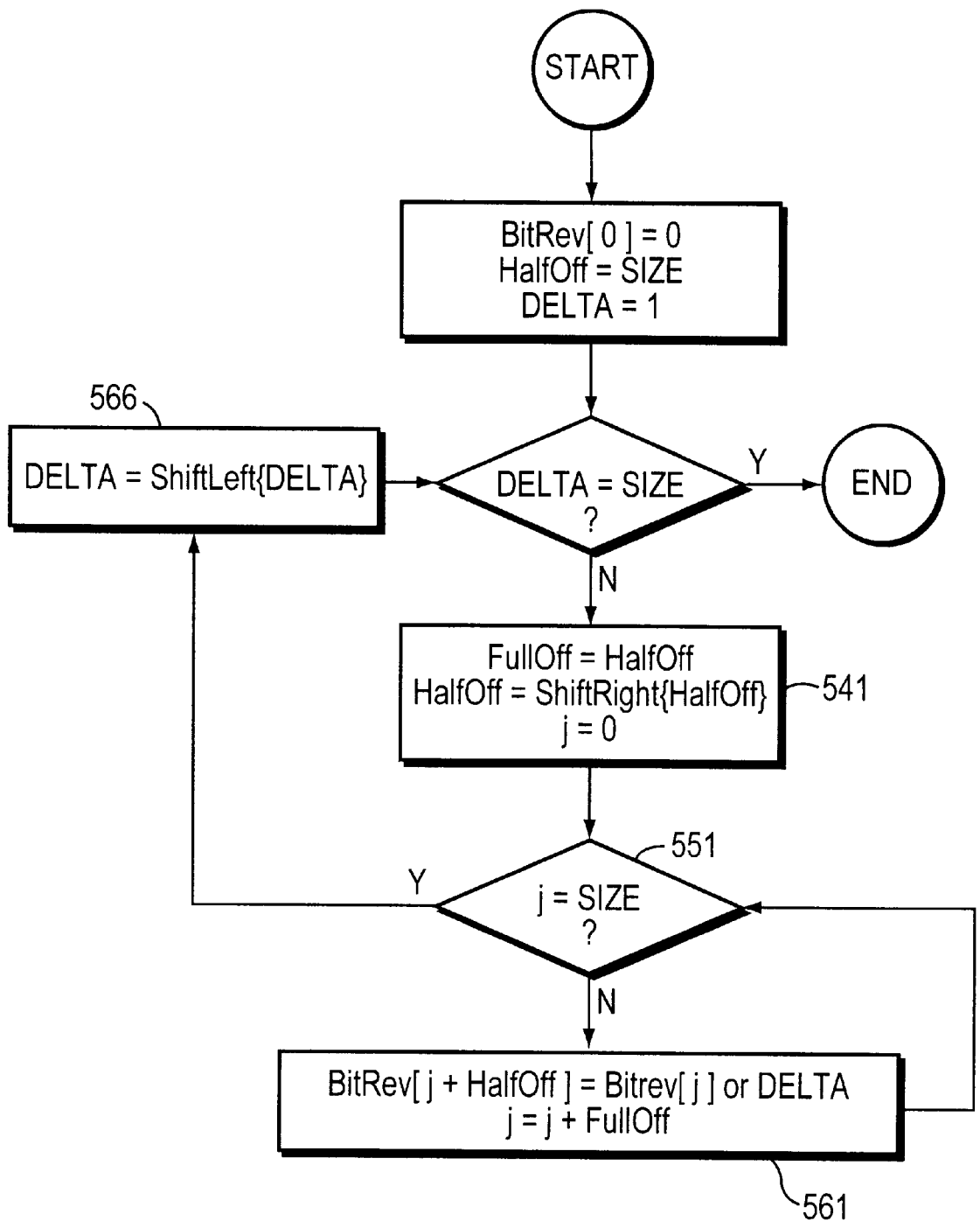

FIG. 5b shows a preferred implementation of the method of FIG. 5a. The difference is that steps 541, 551, 561, and 566 replace more costly exponential and addition operations with bit shifts and bit ORs.

Hardware Implementation

Figure 6:
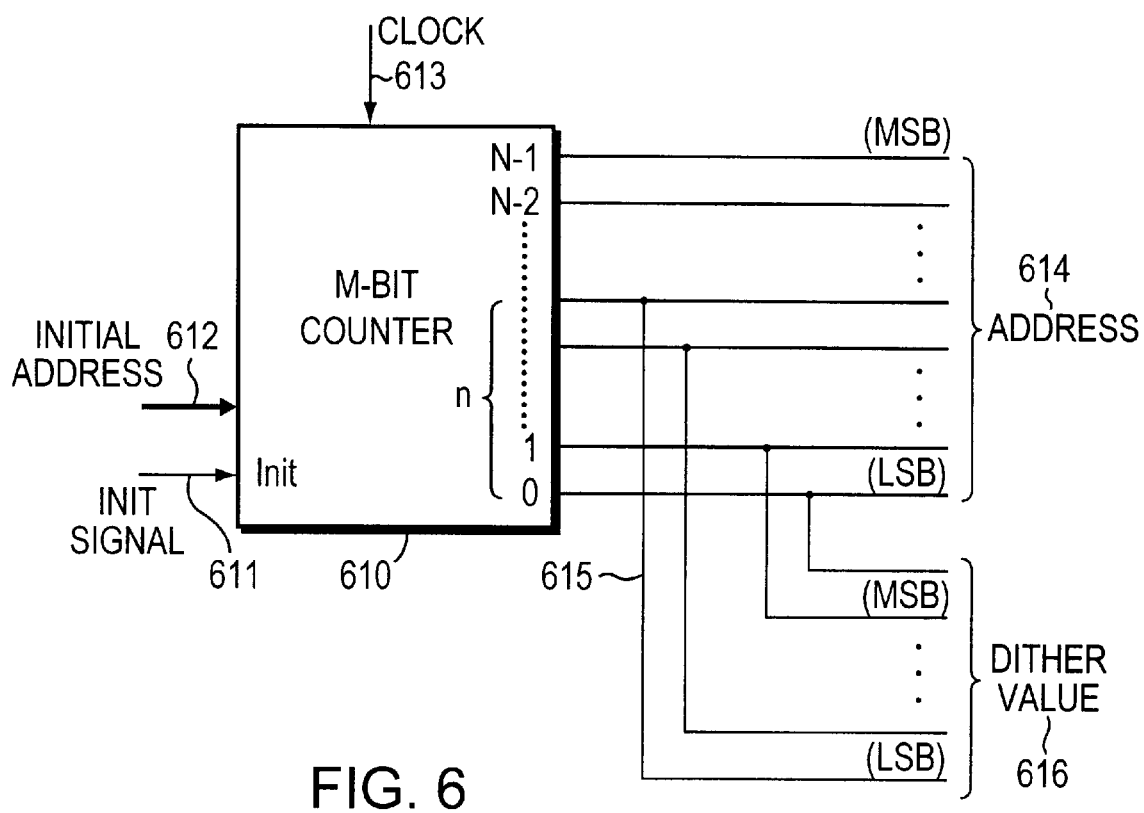
FIG. 6 is a diagram of bit-reversal circuit.

As shown in FIG. 6, sequential dither values for pixels can be generated by using a counter 610 and wire-reversing the output of the counter. An address of a pixel in an image can be sequentially updated as follows. The counter 610 is initialized by an init signal on line 611 along with an initial address signal supplied on line 612. A clock signal on line 613 increments the counter for each pixel position on a raster line. The output of the counter is the address 614. The bit values of the address (MSB to LSB) 614 are reversed by wiring (LSB to MSB) 615 to give the corresponding dither value 616.

In the case where a pixel dimension can include up to $2^N$ possible addresses, an N-bit counter may be needed to accommodate all addresses. The lower n bits (least significant) of the resulting address can be reversed to form the dither value.

As described above, this can be accomplished by reversing the significance of the bits; the least significant bit (LSB) of the address serves as the most significant bit (MSB) of the dither value, the second least significant bit of the address serves as the second most significant bit of the dither value, and so forth. This pattern would continue up to the $m^{th}$ bit of the address, which would map to the LSB of the dither value.

When the init signal 611 is asserted, the counter 610 is initialized by the value of the initial address 612, which is not necessarily zero as described above with reference to FIG. 2 and 3. There, the initial address or its equivalent is supplied by the first dither value as obtained from the vertical look-up table. It is this initial offset feature (phase shifting) that makes the use of a one-dimensional dither suitable for multi-dimensional dithering.

The fundamental characteristics of the one-dimensional dither array described here does not change by phase shifting it; different initial address values have the exact effect of imparting a phase shift.

The initial address 612 is loaded when the init signal 611 is asserted. This feature, as will be described below, is key for the design of a good two-dimensional dithering. If the same initial phase where used for all pixel lines in an image, the same one-dimensional dither patterns would be copied on every line in the same order resulting in vertical streaks.

Figure 7:
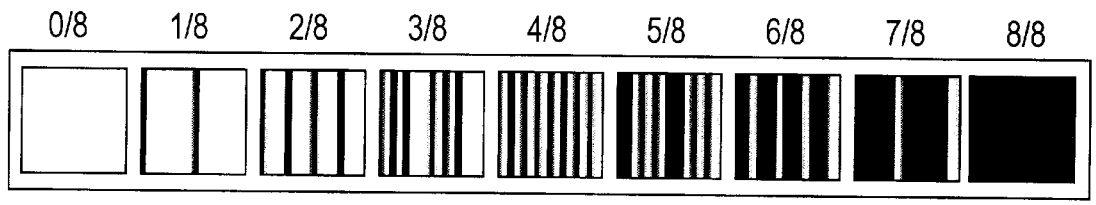
FIGS. 7, 9, and 10 shows dithering patterns produced by one-dimensional dither arrays.

This is illustrated in FIG. 7 for the case of the 8-element 1-D dither array of Table A. Fixed gray levels of {0/8, 1/8, 2/8, 3/8, 4/8, 5/8, 6/8, 7/8, and 8/8} are dithered. For each gray level, a 16×16 bi-tonal pixel image is shown in FIG. 7. While the patterns may be homogenous in the horizontal direction, FIG. 7 clearly illustrates the lack of homogeneity in two dimensions.

Figure 8A:
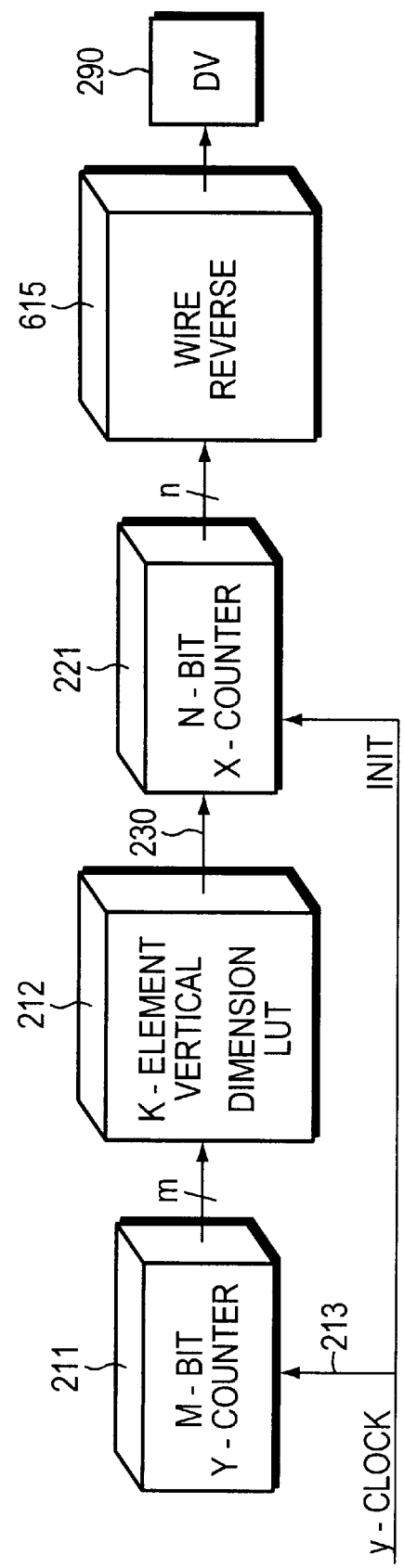
FIG. 8a is a block diagram of a wire-reversed sequentially accessed dithering system.
Figure 8B:
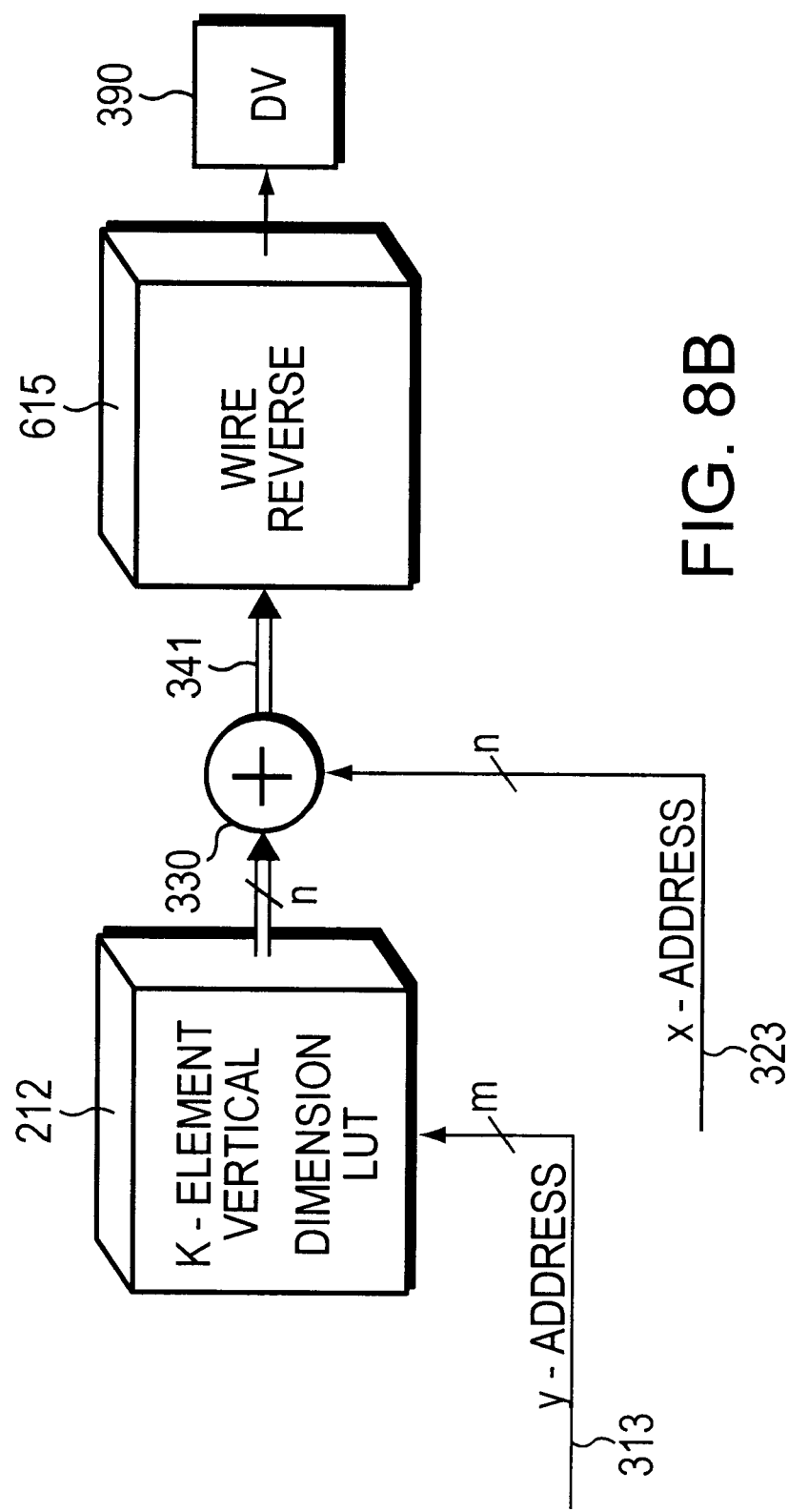
FIG. 8b is a block diagram of a wire-reversed randomly accessed dithering system.

A 2-D dither system that exploits the initial phase feature of FIG. 7 is shown in FIG. 8*a*. This system is similar to the system 200 shown in FIG. 2, except that the horizontal LUT 222 of FIG. 2 has been replaced by the wire reversing 615 of FIG. 6. The sequential dither values 290 are obtained by wire reversing the output of the x-counter 221. It should be understood, that the system 300 of FIG. 3 can similarly be enhanced by wire reversing the output of the adder 340 s shown in FIG. 8*b*. It should be understood that wire reversing the last stage makes sense because here the dither values are accessed most frequently.

Design of the Vertical Phase Array

Both the sequential systems of FIG. 2 and the random-access system 300 of FIG. 3 depend on the nature of the first dither values in the vertical phase LUT 211. The following sections describe general solutions for a look-up table having, for example, $2^N$ entries, and where each value 0, 1, ..., ($2^N$–1) is included once, and only once, in the look-up table 212. The number of permutations of the set of numbers {0, 1, ..., ($2^N$–1)} is ($2^N$) factorial, or ($2^N$)!. This can be a very large number. For a 32×32 dither array, there are approximately $32!=2.6\times10^{35}$ candidate solutions.

Choosing the best solution could require analyzing and quantifying the quality of all of the dither patterns that result from each possible candidate solution. Clearly this is an impossible task using known computer systems for $2.6\times10^{35}$ candidate solutions. Therefore, certain candidates should be eliminated up front. For example, candidates that lack homogeneity should be ruled out.

Figure 9:
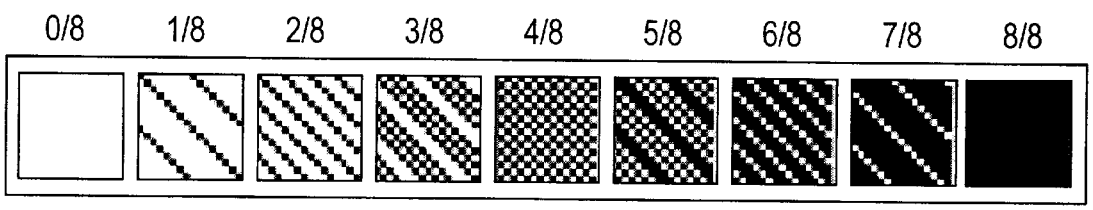
Figure 10:
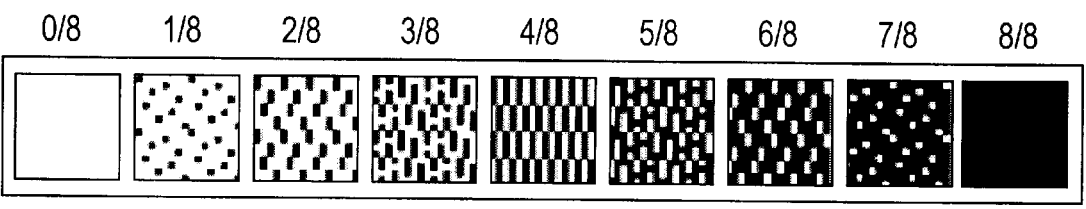

FIG. 9 shows patterns for one such 8×8 element case. Here, the vertical phase array in the LUT 212 would be [0 1 2 3 4 5 6 7]. Since homogeneity is desirable, an obvious choice is to use the bit-reversed 1-D dither array as described above. The phase array would be [0 4 2 6 1 5 3 7] for the 8×8 element case. The resulting pattern is shown in FIG. 10. While the output here is much more uniformly distributed, there is still considerable clumping of like-colored pixels.

Choices in Building a 1-D Dither Array

It appears that the homogeneous nature of the bit-reversed 1-D dither array as described above is a good choice for a vertical phase array. However, if the vertical phase array has the identical order as the horizontal dither array, then the two arrays interacts in such as way as to form some correlated clumping.

Therefore, the 1-D recursive tessellation method as described above with reference to FIG. 4 is re-evaluated to find equivalently homogeneous distributions but with different dither arrays. The resulting different dither arrays can be used as candidate vertical phase arrays instead of bit-reversed arrays.

FIG. 11 illustrates the step-by-step design process for building up a homogeneous vertical phase array in the case of an 8-element dither array. FIG. 11 shows the build-up of the binary pattern from stage (a) where 0 out of 8 pixels on, to (i) with 8 out of 8 pixels on, column. The binary pattern, e.i., pixel cells, is assumed to extend forever to the left and to the right replicating the same 8-pixel pattern, the fundamental period (eight bits) of which is indicated on the top of the Figure.

As for FIG. 4 above, the order that pixels are turned on is governed by the elements of the dither array. The state of build-up of the dither array is also shown in each stage 1101 in FIG. 11. At the bottom of the FIG. 10, the address 1104 of the elements in the dither array is indicated. The mission is to order the 8-element array from 0 to 7 in such a way as to make the resulting binary pattern as homogeneous as possible for all gray levels.

The build up begins in stage (a) with a blank binary pattern having a predetermined pixel cell in each dither period, and identical number of elements in a blank dither array. In this and in other stages, downward arrows indicate candidate choices that will produce equally homogeneous distributions. In part (a) all 8 locations are equal possibilities. Also in this and in other parts of FIG. 11, the $0^{th}$ candidate cell in the pattern that is chosen in indicated by a bold arrow 1108. Therefore, the corresponding element in the bit array is set to zero.

In stage (b), the selection from part (a) is manifested as a black pixel in the binary pattern and value of 0 in the dither array to indicate the $0^{th}$ selection. This results in a "tile" of size 8 pixels periodically replicated. To maximize homogeneity the next pixel to turn on should be in the center of the void between with "on" pixels. The arrow in stage (b) selects the center of this void, and the center of the tile, i.e., the $1^{th}$ candidate selects the $4^{th}$ bit. Therefore, the fourth element of the bit array is set to 1. There are no other candidates equal in homogeneity to this one, and so the choice is unconditionally the single candidate shown.

In stage (c), this choice is shown as black pixel in the selected location and a value of 1 in the corresponding location in the dither array. A new periodic tile of size 4 is evident. In this case there are 2 equally likely candidates— the centers of the two tiles. Either one can be chosen, and in this example the first is selected as indicated by the bold arrow, and the corresponding element for the second candidate is set to 2. Also shown in stage (d) is the center of the remaining void as the single and unconditional next selection.

There is a new tile size in force of 2 pixels in stage (e). There are 4 tiles of size 2 with arrows marking the void centers of each of the 4 equal candidates. These are shown at addresses 1, 3 ,5, and 7. By convention, candidates are counted from left to right starting with 0 from the location of the last choice. The previous stage with a choice was stage (d) where the choice was bit address 2. So, choice 0 would be bit address 3, choice 1 would be address 5, choice 2 would be address 7, and choice 3 would be address 1. In stage (e) the choice is 2, the location at address 7 and is indicated with a bold arrow, and a 3 is stored in the corresponding element of the dither array for the third selection.

In stage (f), once again there is a single unconditional choice with only one location is the most homogeneous candidate. In general, every other step will have an unconditional choice that is exactly one the half dither period away from the last selection.

In stage (g), the remaining two candidates are equally likely. The location at address 1 is choice 0 and the location at address 5 is choice 1. In this example the choice taken is 1.

The final and unconditional choice is shown in stage 7(h). In stage (i), the final dither array is shown: [0 7 2 5 1 6 3 4].

Generalized 1-D Recursive Tessellation

The design process shown in FIG. 11 can be generalized for any power of 2 of N. For an array with size=$2^N$, exactly half of the elements have a greater-than-one-choice of candidates. In the 8 element array of FIG. 11, 4 values had equally homogeneous choices: stage (a) had 8 choices, stage (c) had 2 choices, stage (e) had 4 choices, and stage (g) had 2 choices. Therefore, one can say that the choice size vector for an array of size 8 is [8 2 4 2]. The choice size vectors for arrays of sizes 4, 8, 16, 32, and 64 are shown in Table B.

TABLE B

| Size | Choice Size Vector | Number of Unique Choices | Total Unique Arrays |
|---|---|---|---|
| 4 | 4, 2 | 0 | 1 |
| 8 | 8, 2, 4, 2 | 2 | 8 |
| 16 | 16, 2, 4, 2, 8, 2, 4, 2 | 6 | 1024 |
| 32 | 32, 2, 4, 2, 8, 2, 4, 2, 16, 2, 4, 2, 8, 2, 4, 2 | 14 | 33,554,432 |
| 64 | 64, 2, 4, 2, 8, 2, 4, 2, 16, 2, 4, 2, 8, 2, 4, 2, 32, 2, 4, 2, 8, 2, 4, 2, 16, 2, 4, 2, 8, 2, 4, 2 | 30 | $7.205794 \times 10^{16}$ |

The product of all of the elements in the choice size vector equals the total number of dither arrays that are equally homogeneous as the bit-reverse array. However, some of them differ by a translational shift or mirror reflection. The translational shifted versions can be omitted by removing the first element of the choice size vector. That is, the first element is selected to always be the first location. In FIG. 11, this eliminates the 8 choices. Mirror reflected arrays could be omitted by throwing away the second element of the choice size vector.

In Table B, the column labeled "Number of Unique Choices" is the number of elements in the choice size vector less one for translational redundancy and less one for mirror redundancy. "Total Unique Arrays" is the product of the unique choice sizes. The important point is that these totals are much less than ($2^N$) factorial. Of particular interest is for size=32, the number of permutation candidates dropped from $\sim 3 \times 10^{35}$ to a much more manageable $\sim 3.3 \times 10^7$.

Figure 12:
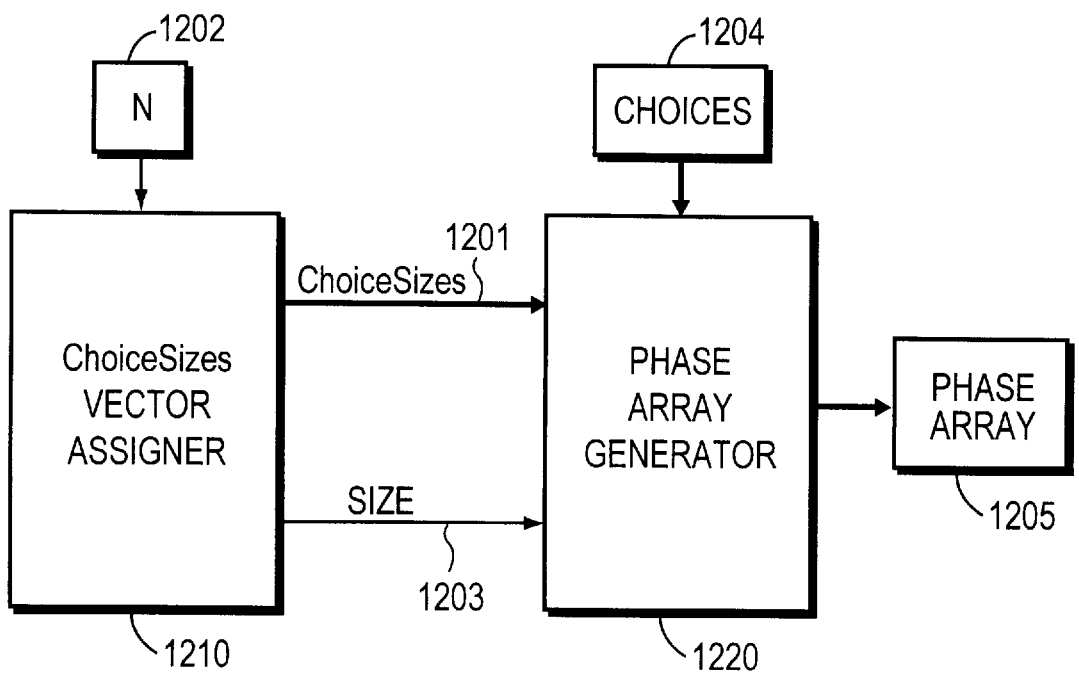
FIG. 12 is a block diagram of a system for generating dither arrays.

Based on this generalize process, a system 1200 for building a vertical phase array is shown in FIG. 12. A ChoiceSizes Vector Assigner 1210 passes the ChoiceSizes vector 1201 to a Phase Array Generator 1220, based on the given value of the power N 1202. Also passed to the Phase Array Generator 1220 is the size 1203 the array. The size 1203 is set to equal $2^N$. A vector of Choices 1204 is also input to the Phase Array Generator 1220. There are size/2 elements in the ChoiceSizes vector 1201, and the Choices vector 1204. The value of each element in the Choices vector 1204 is less than the corresponding element in the Choice-Sizes vector 1201.

With this initialization information, the Phase Array Generator 1220 produces a unique Phase Array 1205 with a number of elements equal to the "size" 1203.

Figure 13:
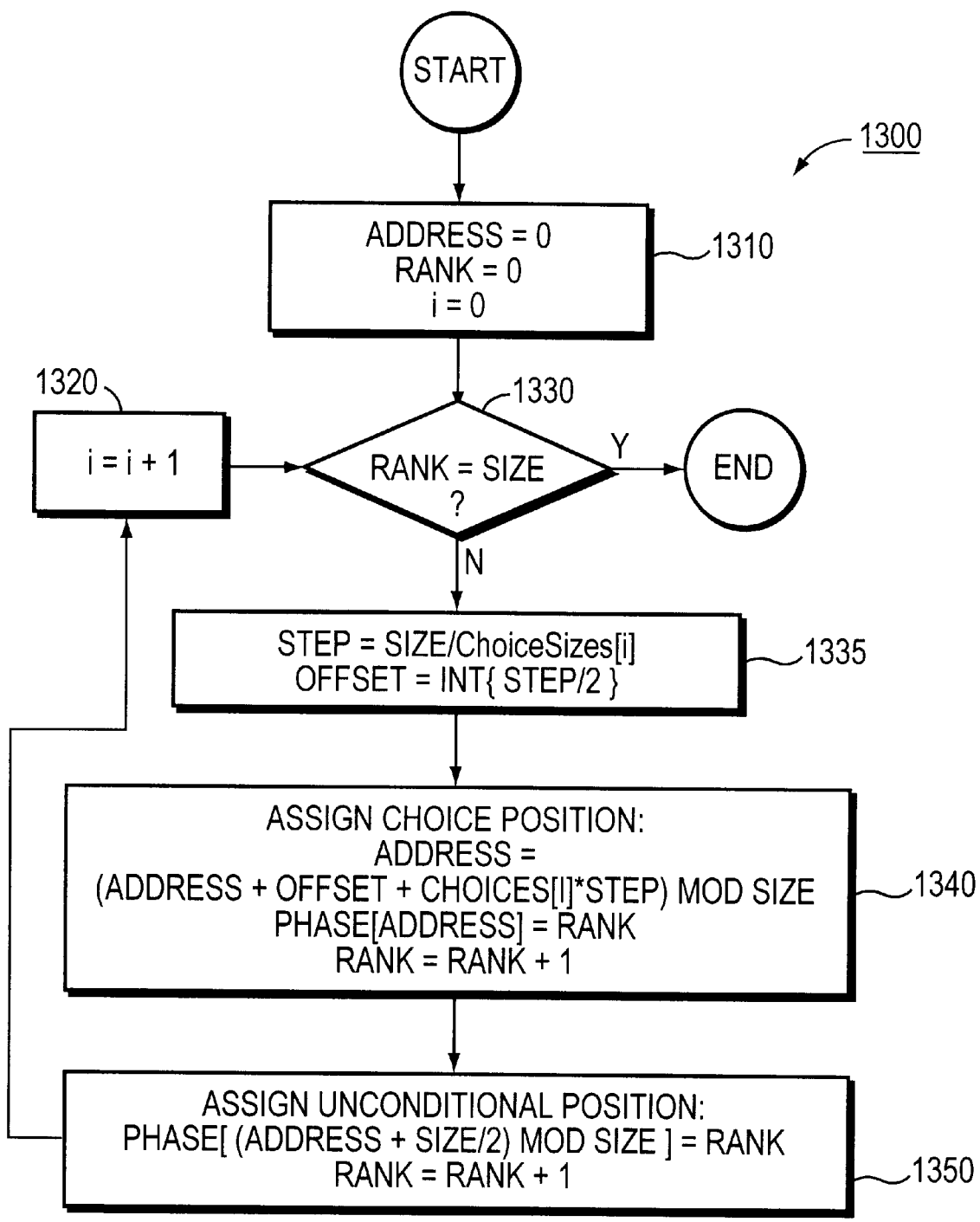
FIG. 13 is a flow graph of a method for generating dither arrays.

FIG. 13 details the process steps 1300 performed by a method of the Phase Array Generator 1220. This method generalizes the build up shown in FIG. 11. In FIG. 13, the values rank are the values of the individual elements in the phase array, e.i., dither values. The value rank starts with value 0, values address and i also are initialized to zero in step 1310. In step 1320, the value rank counts up to a value (size-1) at which point the process terminates when checked in step 1330. The computation of the addresses into which the value rank is loaded is the focus of the method. The values of the variables step and offset are set in step 1335.

For each consecutive pairs of ranks, e.i., phase array element values, one case 1340 has a "choice" position associated with it, and the other case 1350 is assigned an "unconditional" position. Pairs of ranks are selected by the index "i". Recall, conditional and unconditional choices alternate.

For each pair of ranks, the step size is determined in step 1335. The step size is equal to the tile size (bit period) as defined above. The offset is equal to half of a step. The choice position (address) is determined to be equal to the last address plus the offset plus a choice number of steps. Because the sum may be greater than "size", the sum is normalized by modulo size (mod size). The unconditional position of a pair of ranks is always assigned to the unconditional address that is size/2 units away from the last rank.

Example

Table C below indicates that there are 8 total unique phase arrays for an array size of 8. Although the choice size vector is [8 2 4 2] from the second row of Table B, redundancy due to translation and reflection are eliminated by always forcing the first two choice values to 0. Using the method of FIG. 13, the 8 unique phase arrays are:

TABLE C

| | Phase Array | Choice Vector |
|---|---|---|
| a | [07241635] | [0000] |
| b | [06241735] | [0001] |
| c | [05271436] | [0010] |
| d | [05261437] | [0011] |
| e | [06251734] | [0020] |
| f | [07251634] | [0021] |
| g | [04261537] | [0030] |
| h | [04271536] | [0031] |

Figure 14:
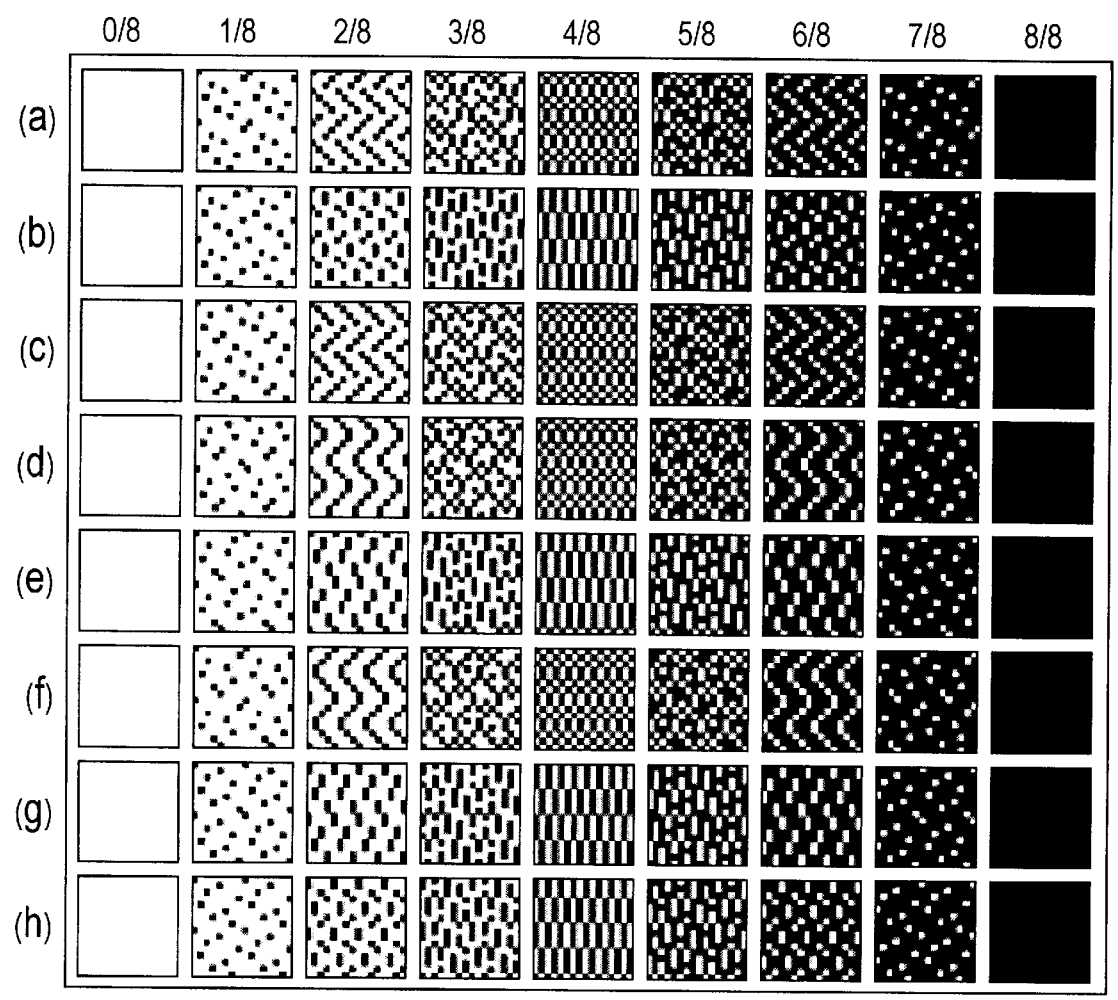
FIGS. 14, 15, and 16 show dither patterns produced by the generated dither arrays.

The dither patterns resulting from applying these arrays to the vertical LUT 211 the systems of either FIG. 2 or 3 are shown in FIG. 14. As before, a 16×16 pixel image is shown for each of the 9 gray levels. The reason for this is that the dither patterns have a period of 8×8 pixels and showing 4 periods in this way allows full examination of the wrap-around properties of the patterns.

It is particularly interesting to note that the phase array in row (g) of Table C is identical to the bit-reversed dither array of FIG. 4, and patterns (g) of FIG. 14 are identical to the patterns shown in FIG. 10. Also, the phase array build in the example of FIG. 13: [0 7 2 5 1 6 3 4] is shown as patterns (f) in FIG. 11. FIG. 14 makes it clear that the eight phase arrays listed above are unique in that none of them are translations or reflections of another.

However, examination of FIG. 14 reveals that for every vertical phase array there is set of patterns with another array that differ only by translation. In this 8×8 case, the following pairs of patterns are essentially identical: phases (a) and (c); phases (b) and (h); phases (d) and (f); and phases (e) and (g). This redundancy is due to a complex interaction of the vertical phase array with the horizontal dither array and predicting these patterns, based on the phase array values, is not obvious.

In general, it is found that the redundancy factor for an array of size $2^N$ is $2^{N-2}$. So, for size=8, there will be sets of 2 copies. For size=32 there will be sets of 8 copies. Therefore, techniques described herein are particularly useful for determining arrays of size 32.

Figure 15:

FIG. 15 illustrates the dither patterns (all black excluded) when the bit-reversed phase array is used for the last (horizontal) dimension: [0 16 8 24 4 20 12 28 2 18 10 26 6 22 14 30 1 17 9 25 5 21 13 29 3 19 11 27 7 23 15 31]

Analyzing all of the dither patterns that form the 33,554, 432 unique phase arrays for homogeneity reveals that the following pattern gives very good results: [0 22 12 30 4 19 10 24 2 21 15 28 6 16 9 27 1 23 13 31 4 18 11 25 3 20 14 29 7 17 8 26]

Figure 16:
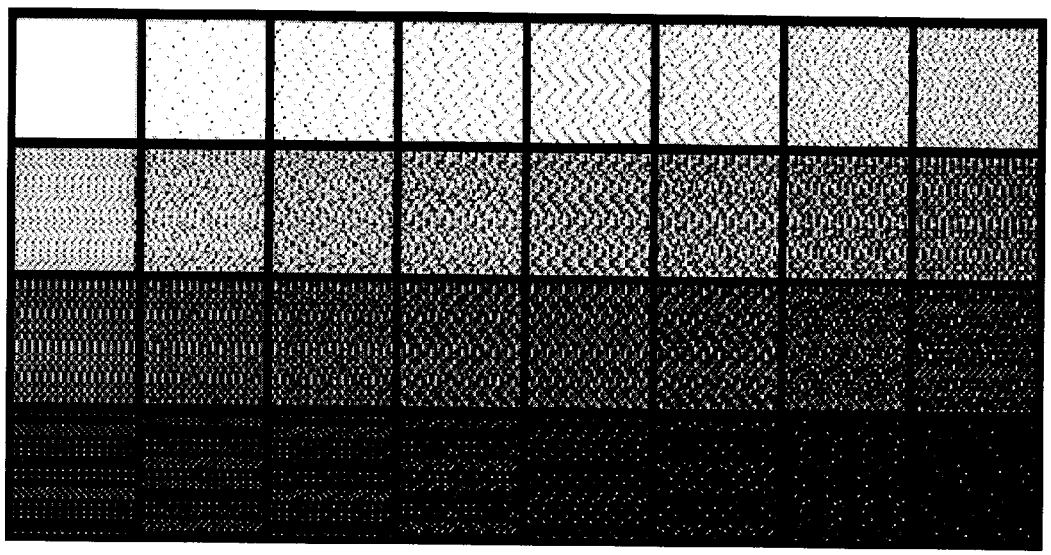

The patterns associated with this phase array are shown in FIG. 16. Both FIGS. 15 and 16 show 4 periods of each gray level (64×64 pixels) to examine the wrap-around properties of the patterns.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. An apparatus for dithering a digital signal in a plurality of dimensions where each digital signal has an address in each of the plurality of dimensions, comprising:

first means for generating first dither values for a first dimension based on first addresses of the first dimension;

second means, serially connected to the first means, for generating second dither values for a second dimension based on a combination of the first dither values and second addresses of second dimension, the second dither values being the final dither values.

2. The apparatus of claim 1 wherein the first and second means respectively include:

a first counter incremented for each sequentially accessed first address of the first dimension, a first table storing the first dither values as a one-dimensional array, and means for indexing the first table according to current values of the first counter to generate the first dither values; and a second counter initialized by the first dither values and incremented for each sequentially accessed second address of the second dimension, a second table storing the second dither values, and means for indexing the second table according to current values of the second counter to generate the second dither values.

3. The apparatus of claim 1 wherein the first and second means respectively include:

a first table storing the first dither values as a one-dimensional array, and means for indexing the first table according to a first predetermined least significant number of bits of the first addresses to generate the first dither values; and means for adding the first dither values to the second addresses, a second table storing the second dither values as a one-dimensional array, and means for indexing the second table according to a second predetermined least significant bits of the sum of the first dither values and the second addresses to generate the second dither values.

4. The apparatus of claim 1 wherein the first and second means respectively include:

a first counter incremented for each sequentially accessed first address of the first dimension, a first table storing the first dither values as a one-dimensional array, and means for indexing the first table according to current values of the first counter to generate the first dither values; and a second counter initialized by the first dither values and incremented for each sequentially accessed second address of the second dimension, and reverse wire means connected to the second counter for generating the second dither values from the current values of the second counter.

5. The apparatus of claim 1 wherein the first and second means respectively include:

a first table storing the first dither values as a one-dimensional array, and means for indexing the first table according to a first predetermined least significant number of bits of the first addresses to generate the first dither values; and means for adding the first dither values to the second addresses, and reverse wiring means connected to the means for adding for generating the second dither values according to a second predetermined least significant bits of the sum of the first dither values and the second addresses to generate the second dither values.

6. The apparatus of claims 2 and 3 wherein the number of dither values in the first and second tables is a power of two.

7. The apparatus of claim 1 wherein the digital signals are pixels of an image.

* * * * *